United States Patent [19]

Falk

[11] 4,276,393
[45] Jun. 30, 1981

[54] CHAR-FORMING ADDITIVES FOR OLEFIN POLYMERS

[75] Inventor: John C. Falk, Chicago, Ill.

[73] Assignee: Borg-Warner Corporation, Chicago, Ill.

[21] Appl. No.: 101,607

[22] Filed: Dec. 10, 1979

[51] Int. Cl.³ .................... C08L 9/02; C08L 47/00
[52] U.S. Cl. .................................. 525/233; 525/213; 525/232; 525/238; 525/240; 525/241
[58] Field of Search ............... 525/232, 233, 234, 235, 525/213, 238, 240, 241

[56] References Cited

U.S. PATENT DOCUMENTS

| | | | |
|---|---|---|---|
| 3,369,012 | 2/1968 | Lundberg | 525/334 |
| 3,639,522 | 2/1972 | Narayana et al. | 525/334 |
| 3,933,768 | 1/1976 | Yukutu et al. | 525/333 |

Primary Examiner—J. Ziegler
Attorney, Agent, or Firm—Richard J. Schlott

[57] ABSTRACT

Compositions comprising styrene polymers or polypropylene and dichlorocarbene-modified butadiene polymer exhibit improved flame-retardant behavior and a unique char-forming behavior.

4 Claims, No Drawings

CHAR-FORMING ADDITIVES FOR OLEFIN POLYMERS

BACKGROUND OF THE INVENTION

This invention relates to fire retardant blends comprising olefin polymers and dichlorocarbene-modified butadiene polymers. More particularly, this invention relates to blends comprising polymers selected from the group consisting of styrene polymers and propylene polymers and, as a char-forming flame retardant additive, a dichlorocarbene-modified butadiene polymer.

Dihalocarbene modification of polymers containing ethylenic unsaturation to introduce dihalo cyclopropane units into the polymer chain has long been known. Methods for the preparation of such polymers have been disclosed for example in U.S. Pat. Nos. 3,369,012, 3,676,409 and 3,933,768. The resulting polymers have been shown to be sulfur vulcanizable, to exhibit improved compatability with other rubbers, and to be tough, flame retardant materials. Rubbery butadiene polymers having from 5 to 20 percent of the ethylenic unsaturation dibromo carbene-modified were also disclosed as a useful polymeric flame retardant rubbery substrate for the preparation of high impact polystyrene compositions in U.S. Pat. No. 3,639,522.

The use of organo-halogen compounds as flame retardant additives for polymers is widely practiced. Many are employed together with a synergist such as antimony oxide to improve flame retardant behavior, and the use of polymeric halogen compounds such as polyvinylchloride in blends with other polymers to impart flame resistance is also widely practiced. In as much as polymers vary widely in their burning behavior, whether particular organohalogen compounds or halogen containing polymers will effectively reduce the flammability of a specific plastic material cannot be readily predicted.

SUMMARY OF THE INVENTION

Dichlorocarbene-modified butadiene polymers are effective flame-retardant additives for styrene polymers and propylene polymers. Compositions containing dichlorocarbene modified butadiene polymers exhibit an unusual char-forming capability which enhances the flame retardant behavior. The compositions may further contain synergists and other organo halogen flame retardant compounds.

DETAILED DESCRIPTION OF THE INVENTION

The dichlorocarbene-modified butadiene polymers useful for the practice of this invention are the dichlorocarbene adducts of butadiene polymers wherein greater then 50 percent, preferably greater than 80 percent, still more preferably greater than 90 percent, of the ethylenic double bonds have been converted to dichlorocyclopropane units. The butadiene polymers which may be usefully modified for the purposes of this invention include butadiene homopolymers and copolymers of butadiene with up to 20 wt% of a second monomer such as styrene or acrylonitrile. The dichlorocarbene-modified butadiene polymers may be prepared by any of the various processes shown in the prior art such as for example the process shown for the dichlorocarbene modification of ethylene-propylene-diene monomer terepolymers in the U.S. Pat. No. 3,933,768, as well as the process shown for the dichlorocarbene modification of polymers of butadiene in U.S. Pat. No. 3,369,012. Dichloro-carbene modified butadiene polymers, as well as the processes for their preparation are thus known in the art and are not separately regarded as a part of the instant invention.

The polymers which are flame retarded by the including of dichlorocarbene-modified butadiene polymers are the styrene polymers, such as for example polystyrene, rubber modified styrene polymers including high impact polystyrene, graft polymers of styrene on rubbery polymeric substrates, and graft copolymers of styrene with one or more copolymerizable monomers such as acrylonitrile and methyl methacrylate on rubbery polymeric substrates, as well as polypropylene.

The amount of dichlorocarbene-modified butadiene polymer employed in the preparation of the blends will be from about 5 to about 30 parts by weight per hundred parts of styrene or propylene polymer. At levels below about 5 parts by weight the char-forming and flame retardant characteristics of the blend become vanishingly small, while at levels above about 30 parts by weight, the physical properties of the resulting blends become deleteriously affected, even though the flame retardant characteristics are quite good.

Blends comprising styrene polymers or polypropylene and the dichlorocarbene-modified butadiene polymer may be prepared by melt processes such as mechanical working of the blend on compounding rolls, in an extruder or in a Banbury mixer, or by mechanically blending the powdered resins and molding the resulting compositions. The blends may further comprise flame retardant synergists such as for example antimony oxide, as well as fillers, dyes, pigments, lubricants, stabilizers, antioxidants and the like as is commonly practiced in the art.

The following examples are provided by way of illustration of the principle of the instant invention, but are not to be construed as limiting thereof.

EXAMPLE 1

Dichlorocarbene-modified Polybutadiene

Poly-1,3-butadiene (54 g, 100,000 MW) was dissolved in 500 cc of chloroform containing 1.0 g of benzyl trimethylammonium bromide. The chloroform solution was then mixed with 200 cc of 50 wt% aqueous sodium hydroxide in a 1 liter reactor. The mixture was then stirred and heated at 50° C. for 4 hours. The chloroform layer was separated, washed four times with an equal volume of water, than coagulated by pouring into methanol. The product was collected by filtration and dried under vacuum at 35° C. for 16 hours. The powdery product had 47.5 wt% chlorine content, corresponding to 91.3% conversion of the ethylenic double bonds to dichlorocyclopropane units.

EXAMPLES 2–15

Blends were prepared by banding the base resin on a two-roll mill, adding the powdered dichlorocarbene-modified polybutadiene together with any other additives employed, milling the mixture and sheeting out the resulting blend. Placques were then compression molded and cut into test specimens. The blend compositions and test results are presented in Table I.

TABLE 1

Blends of Polystyrene or Polypropylene with Dichlorocarbene-modified Poly-1,3-Butadiene.

| Ex No | Resin (100pbw) | DCC-B[1] (pbw) | Sb$_2$O$_3$[2] (pbw) | LOI[3] | Char[4] (%) |
|---|---|---|---|---|---|
| 2 | Polystyrene | 0 | — | 17.5 | N.A. |
| 3 | " | 8 | — | 19.7 | N.A. |
| 4 | " | 16 | — | 20.0 | N.A. |
| 5 | " | 24.7 | — | 20.0 | 11.3 |
| 6 | Polypropylene | 0 | — | 17.4 | N.A. |
| 7 | " | 8 | — | 17.8 | N.A. |
| 8 | " | 16 | — | 18.6 | N.A. |
| 9 | " | 24.7 | — | 19.7 | (5) |
| 10 | Polystyrene | 24.7 | 5 | 22.4 | 7.0 |
| 11 | " | 24.7 | 7.5 | 23.2 | 3.4 |
| 12 | " | 24.7 | 10 | 23.4 | 0 |
| 13 | Polypropylene | 24.7 | 5 | 21.2 | (6) |
| 14 | " | 24.7 | 7.5 | 22.9 | (6) |
| 15 | " | 24.5 | 10 | 22.9 | (6) |

Notes:
[1]DCC-B is dichlorocarbene-modified poly-1,3-butadiene, see Ex. 1.
[2]Sb$_2$O$_3$ is antimony trioxide synergist.
[3]LOI is Limiting Oxygen Index, ASTM D-2863.
[4]Char is the wt% of char formed on burning at LOI in GE Oxygen Index gauge.
[5]Visible char formed; could not be isolated and weighed.
[6]Visible char formed; could not be isolated and weighed.

It will be apparent from these data that including dichlorocarbene-modified polybutadiene in blends with polystyrene (Examples 3-5) and with polypropylene (Examples 7-9) improves the LOI value for each of these resins. The LOI value is further improved by including a synergist, as in Examples 10-12 (polystyrene) and 13-15 (polypropylene). The surprising effect is that a substantial amount of heavy, expanded char is also formed, Example 5. The case of polypropylene, Example 9, the character of the char formed did not lend itself to isolation and weighing, but the formation of char was quite visibly increased by the presence of dichlorocarbene-modified polybutadiene. The addition of antimony oxide to the polystyrene blends sharply inhibited char formation, even while improving the LOI values (Examples 10-12).

EXAMPLE 16

A styrene-butadiene (SBR) copolymer containing 20 wt% styrene was dichlorocarbene-modified by the method of Example 1, but employing a 12 hour reaction time. The product had 46.1 wt% chlorine, corresponding to 95% conversion of the ethylenic unsaturation to dichlorocyclopropane units. A blend formed from 100 parts by weight polystyrene, 24.7 parts by weight dichlorocarbene modified SBR and 7.5 parts by weight Sb$_2$O$_3$ had an LOI value of 22.0.

EXAMPLE 17

A blend of 100 parts by weight of an ABS resin, 24.7 parts by weight of the dichlorocarbene-modified polybutadiene of Example 1 and 7.5 parts by weight of antimony oxide had an LOI value of 24.6 and a char residue of 12.1 wt%, demonstrating that the dichlorocarbene-modified polybutadiene is an effective flame retardant and char-forming additive for ABS polymers.

EXAMPLE 18

A copolymer of butadiene and acrylonitrile containing 20 wt% acrylonitrile was dichlorocarbene modified by the procedure of Example 1. The product had 36.1 wt% chlorine, corresponding to (87%) conversion of the ethylenic unsaturation to dichlorocyclopropane units.

A blend of 100 parts of an ABS resin, 24.7 parts by weight of the dichlorocarbene-modified butadiene-nitrile rubber copolymer and 7.5 parts by weight of Sb$_2$O$_3$ had an LOI value of 24.7. The sample had a rating of V-1 in the UL-94 burning test, forming a heavy, rigid, expanded char during the burning test.

EXAMPLE 19

As controls, the following blend compositions were made, following the mill compounding procedure:
A. 100 pbw polystyrene, 24.7 pbw polyvinyl chloride and 7.5 pbw Sb$_2$O$_3$.
B. 100 pbw ABS resin, 24.7 pbw polyvinyl chloride and 7.5 pbw Sb$_2$O$_3$.

In testing, Sample A had an LOI value of 24.6, while Sample B had an LOI value of 24.4. In burn tests, Sample A had a UL 94 rating of V-2, while Sample B had a UL rating of V-0. Both samples formed very little char, and the char was neither rigid nor expanded.

It becomes apparent from a comparison of these control examples with the burning behavior shown for Examples 2-18 that the char-forming behavior of blends containing dichlorocarbene-modified butadiene polymers is both unique and unexpected. Polyvinyl chloride, a known polymeric halogen-containing additive for styrene-containing polymers produces no comparable char in burning tests, even though acting to improve other flame-retardant characteristics. The char-forming behavior of the blends of this invention would find application in end-uses where vertical burn is not likely to be encountered, so that the insulative, non-burning char may act to reduce flame spread. These compositions may also be further compounded with additional flame retardant additives to further reduce flammability, and with known spumifics to increase the rate of char formation.

The present invention will thus be seen to be flame retardant blends comprising polymers selected from the group consisting of styrene polymers and propylene polymers and, as a char forming additive, a dichlorocarbene-modified butadiene polymer.

I claim:

1. A composition comprising 100 parts by weight of an olefin polymer and from about 5 to about 30 parts by weight of a polymer of butadiene having greater than 80% of the ethylenic unsaturation converted to dichlorocyclopropane units.

2. A composition comprising 100 parts by weight of an olefin polymer selected from the group consisting of styrene polymers and polypropylene, and from 5 to about 30 parts by weight of a polymer of butadiene having greater than 80% of the ethylenic unsaturation converted to cyclopropane units.

3. The composition of claim 2 wherein the polymer of butadiene is selected from the group consisting of polybutadiene, butadiene-styrene copolymers and butadiene-acrylonitrile copolymers.

4. A method for imparting flame-retardant and char-forming characteristics of olefin polymers comprising blending 100 parts by weight of an olefin polymer with from 5 to about 30 parts by weight of a butadiene polymer having greater than 80% of the olefinic unsaturation converted to cyclopropane units.

* * * * *